United States Patent [19]

Leonhart

[11] Patent Number: 4,994,857
[45] Date of Patent: Feb. 19, 1991

[54] OVERHEAD LIGHT EXPOSURE APPARATUS

[75] Inventor: Charles J. Leonhart, Schaumburg, Ill.

[73] Assignee: nuArc Company, Inc., Niles, Ill.

[21] Appl. No.: 407,808

[22] Filed: Sep. 19, 1989

[51] Int. Cl.⁵ .............................................. G03B 27/04
[52] U.S. Cl. ........................................ 355/93; 355/85
[58] Field of Search .................. 355/85, 87, 93, 12 D, 355/91, 92

[56] References Cited

U.S. PATENT DOCUMENTS

| | | | |
|---|---|---|---|
| 2,366,722 | 1/1945 | Gaebel | 355/85 |
| 3,176,601 | 4/1965 | Bradley | 355/91 |
| 3,604,801 | 9/1971 | Young | 355/91 X |

Primary Examiner—Richard A. Wintercorn
Assistant Examiner—D. Rutledge
Attorney, Agent, or Firm—Mason, Kolehmainen, Rathburn & Wyss

[57] ABSTRACT

An overhead light exposure unit for making copies on pre-sensitized sheets from images on film includes a base supporting a vacuum blanket for pressing the sheets and film together against a transparent panel. The transparent panel is mounted in a frame that is pivotally secured to the base for movement between a closed horizontal position for making copies and an upwardly tilted, open position for unloading and loading film, sheets and media into place. A light source is positioned above the panel for directing controlled, high intensity light downwardly through the panel to reproduce film images on the pre-sensitized sheets held in place by the vacuum blanket. A support system is provided for holding the light source in an exposure position space directly above the transparent panel for directing controlled intensity light downwardly through the panel to reproduce an image on a silk screen, sheet or film held in place by the vacuum blanket. The support system is operative to move the light source away from the exposure position to an open position to afford better access to and viewing of the working space above the horizontal position of the vacuum blanket for loading and unloading film media, etc., when the frame is in an open position. The light source is maintained within a space above the base defined within an upwardly extending periphery thereof even in the open position and the exposure distance between the light source and the film sheets is minimized when the light source is in the exposure position to reduce the exposure time interval required.

16 Claims, 7 Drawing Sheets

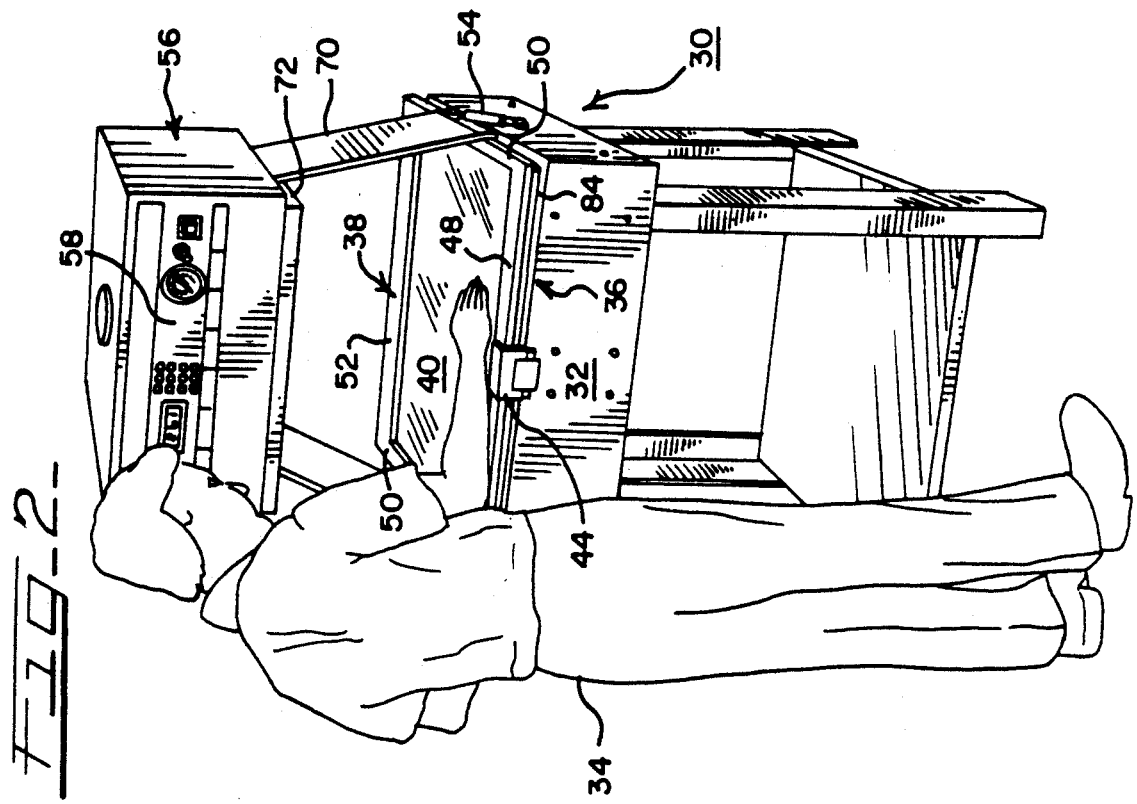
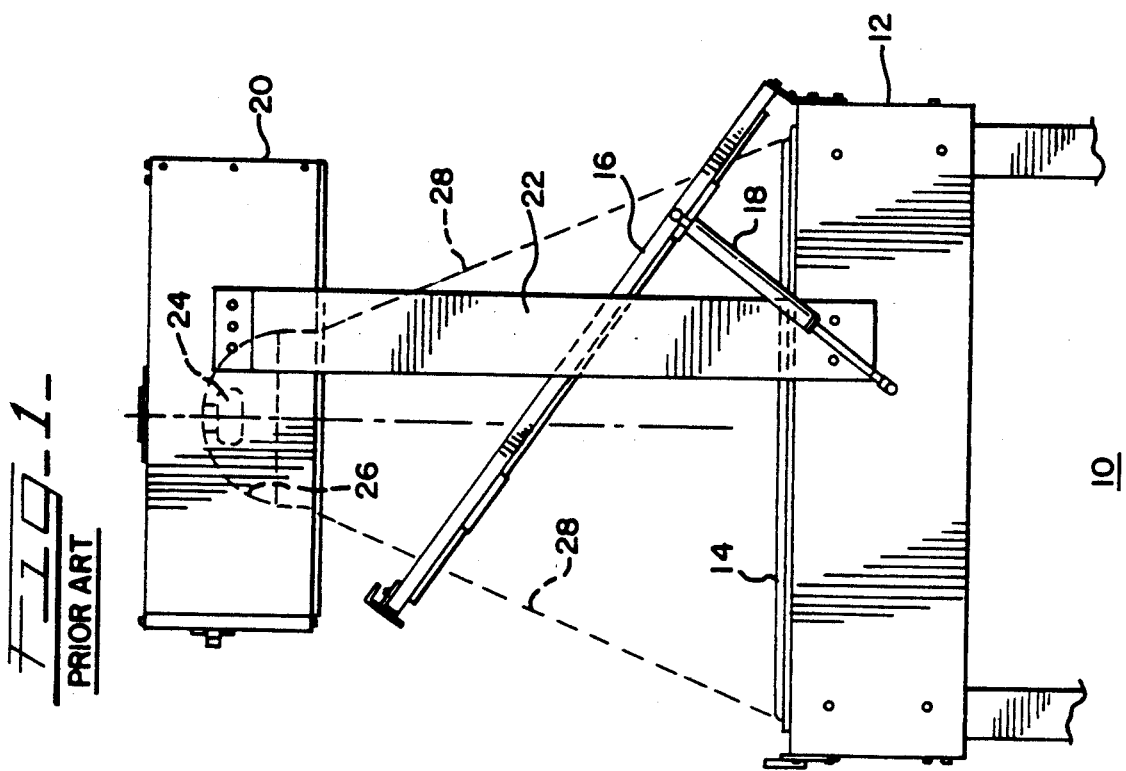

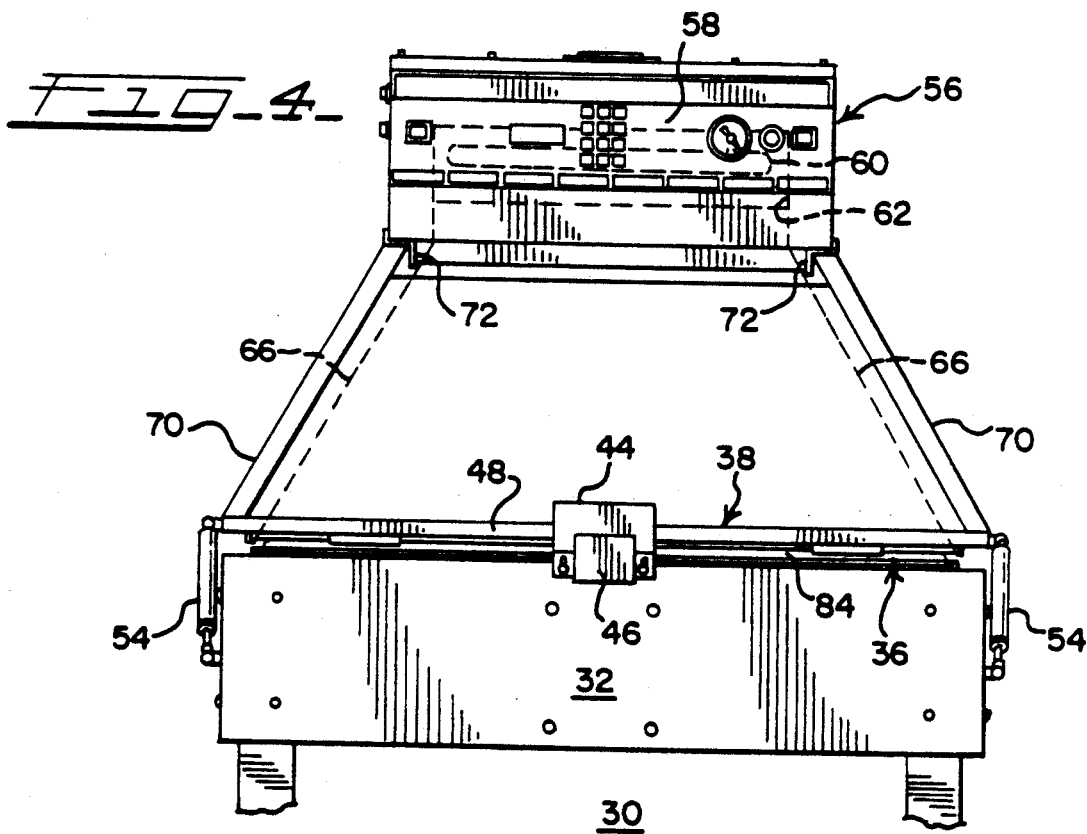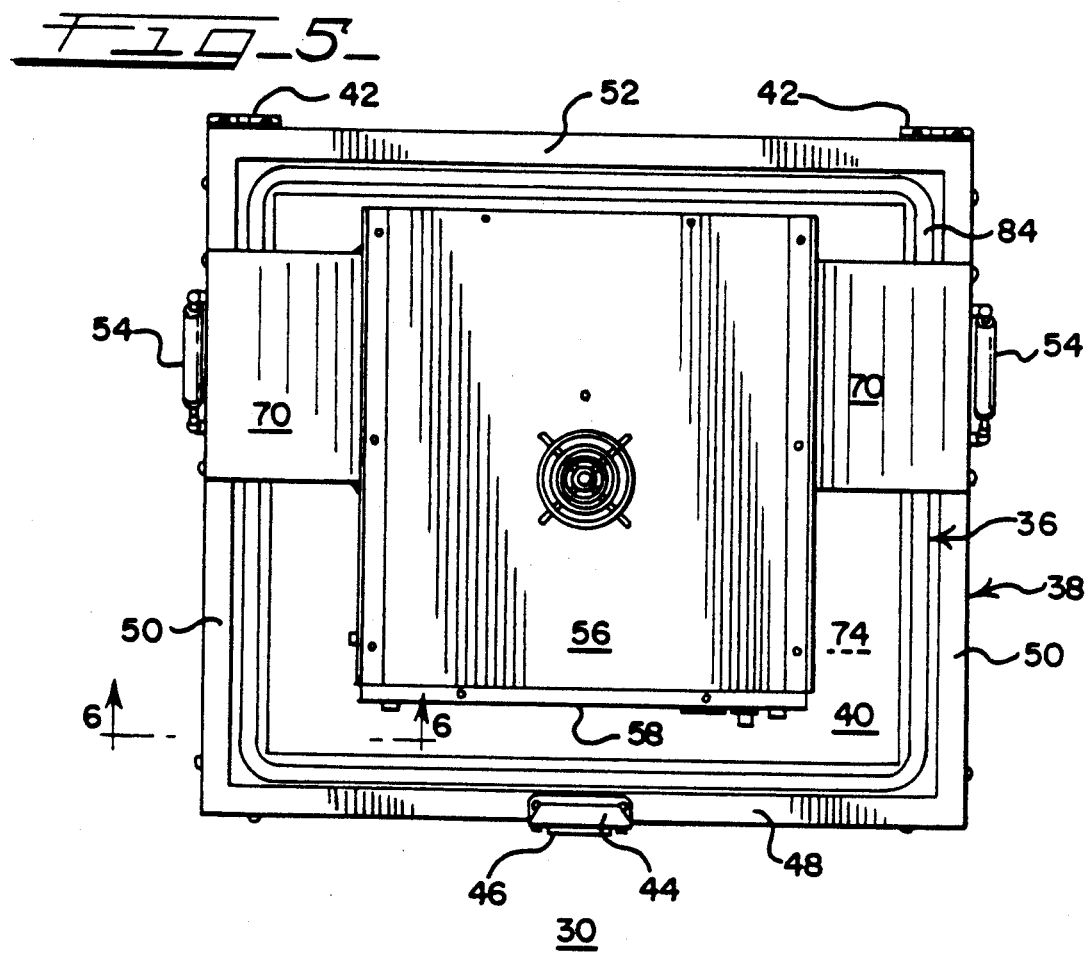

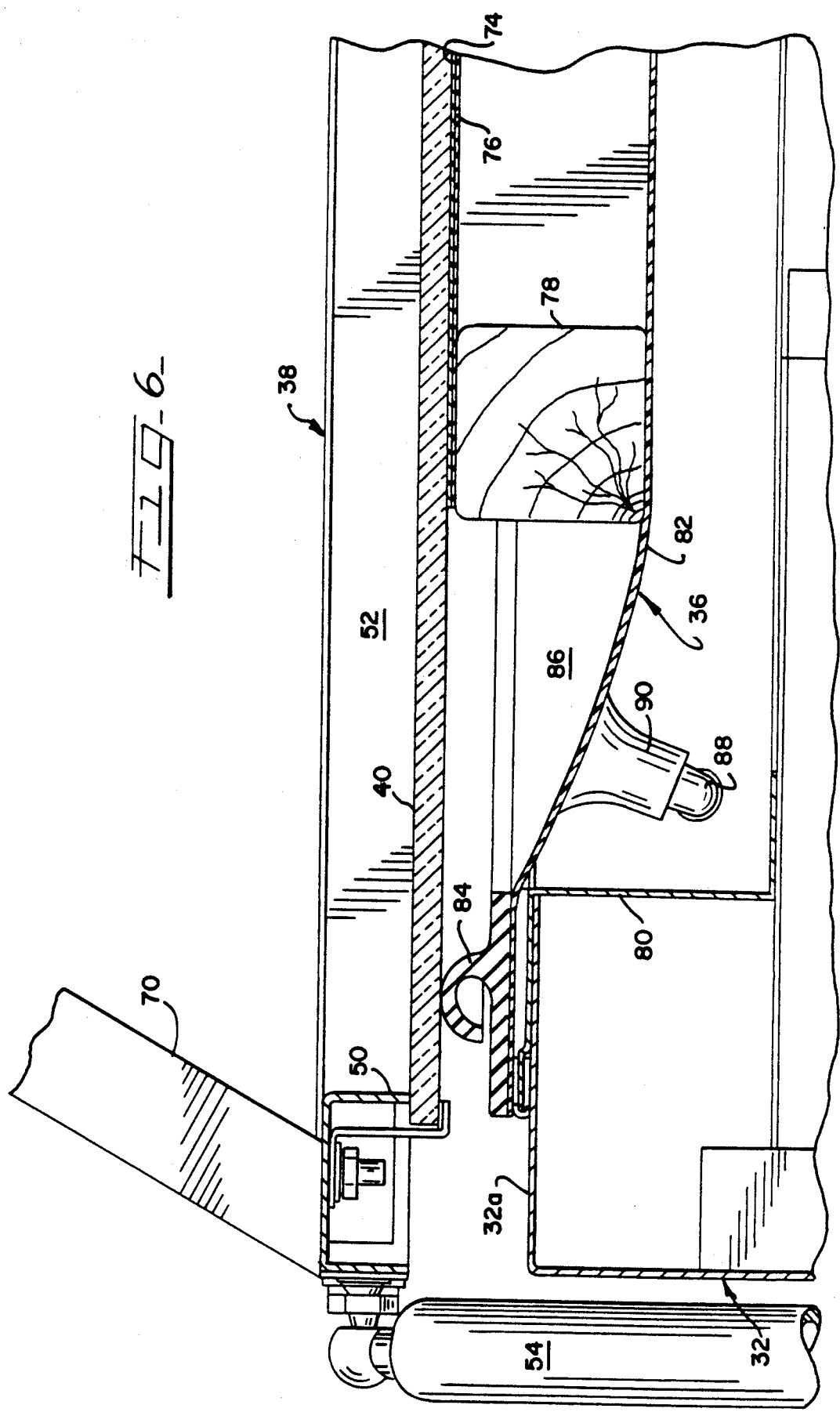

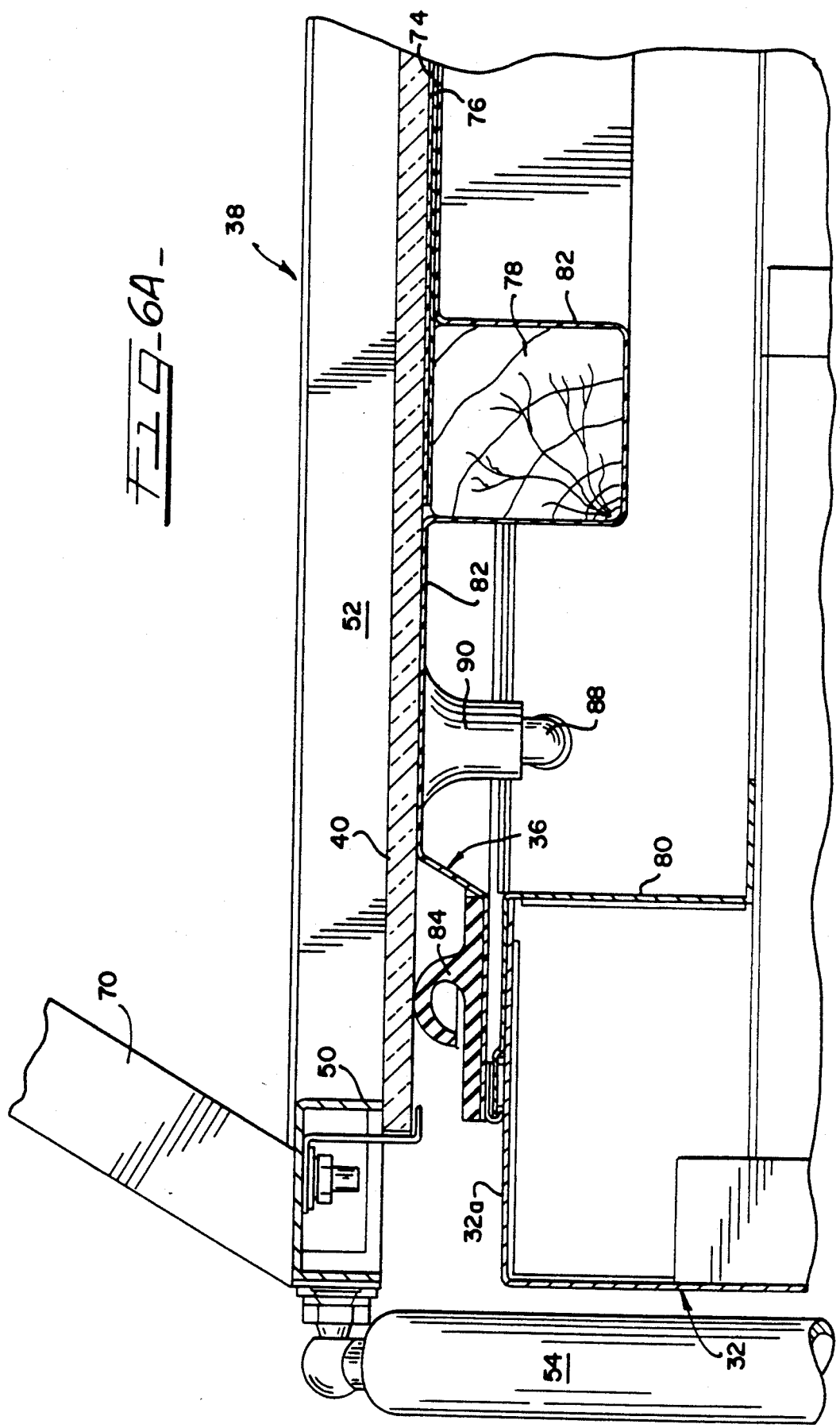

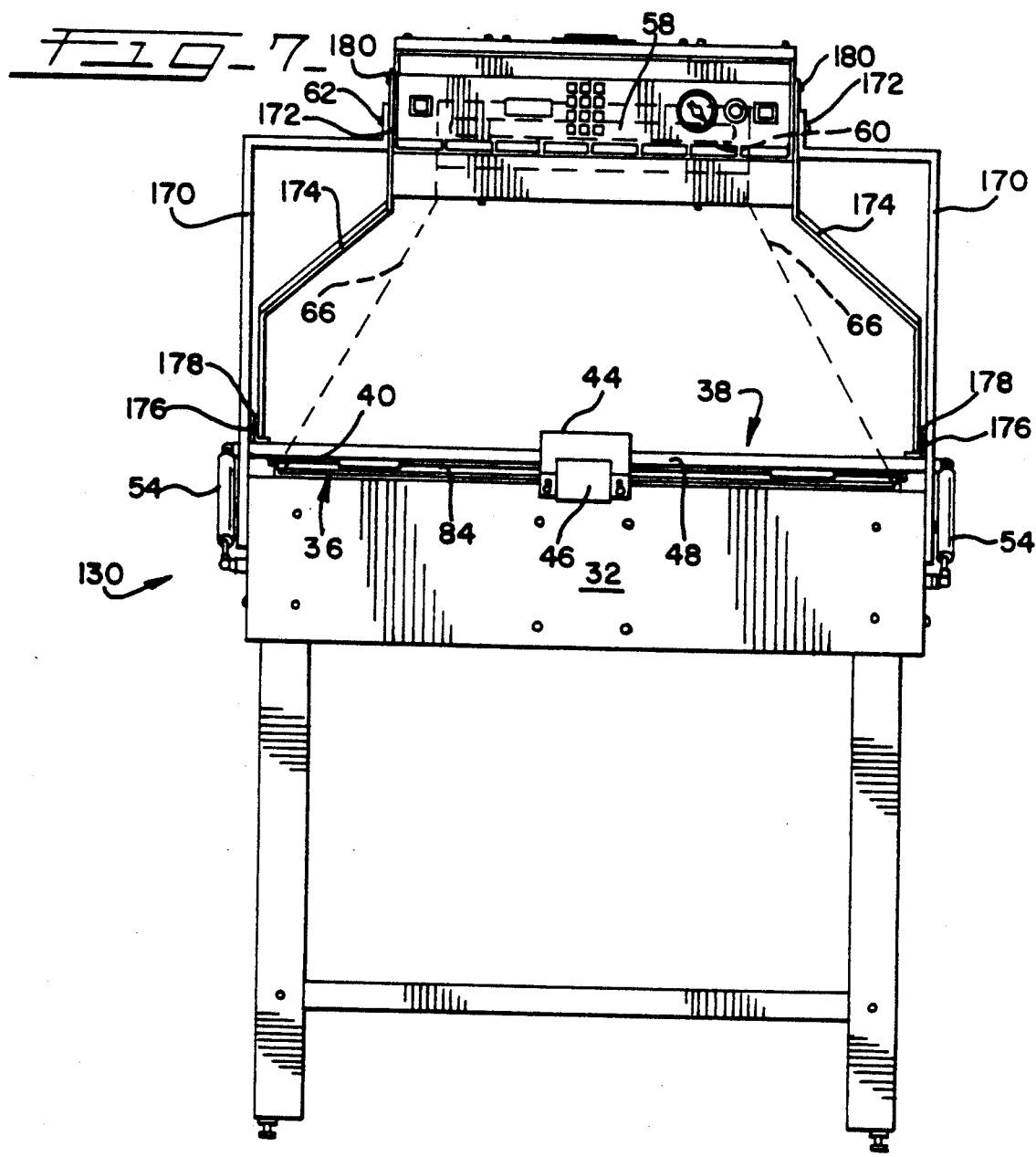

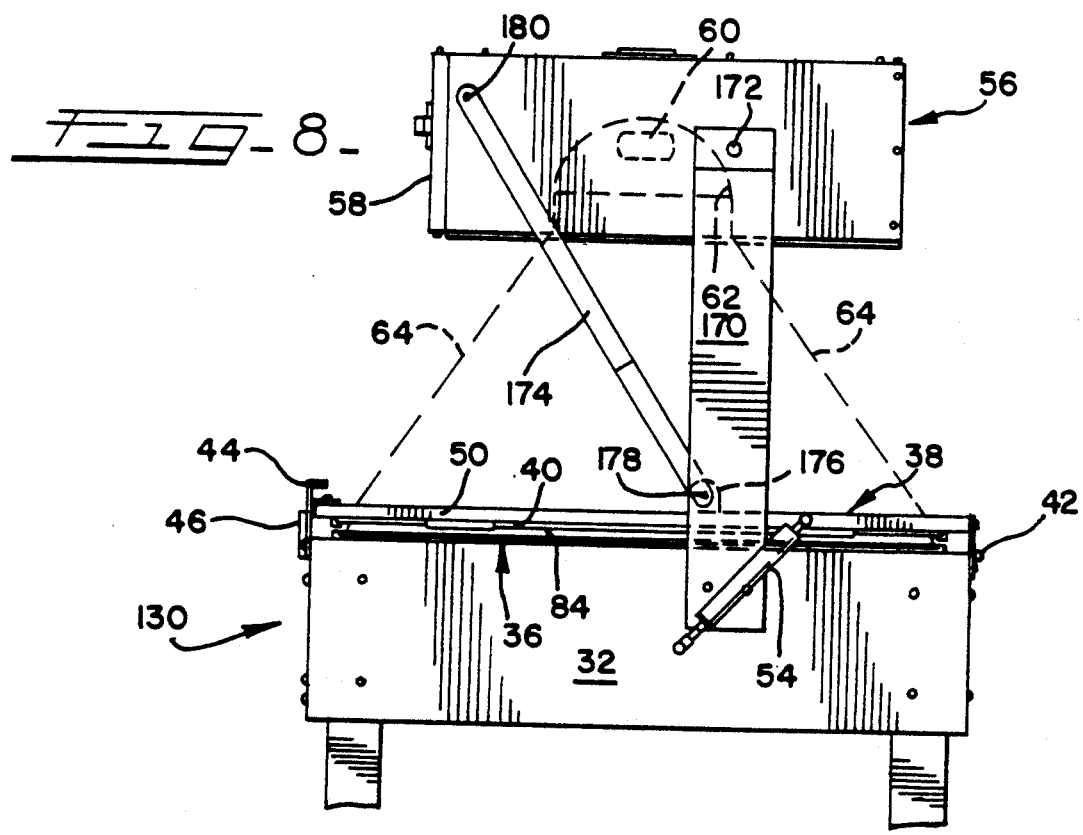
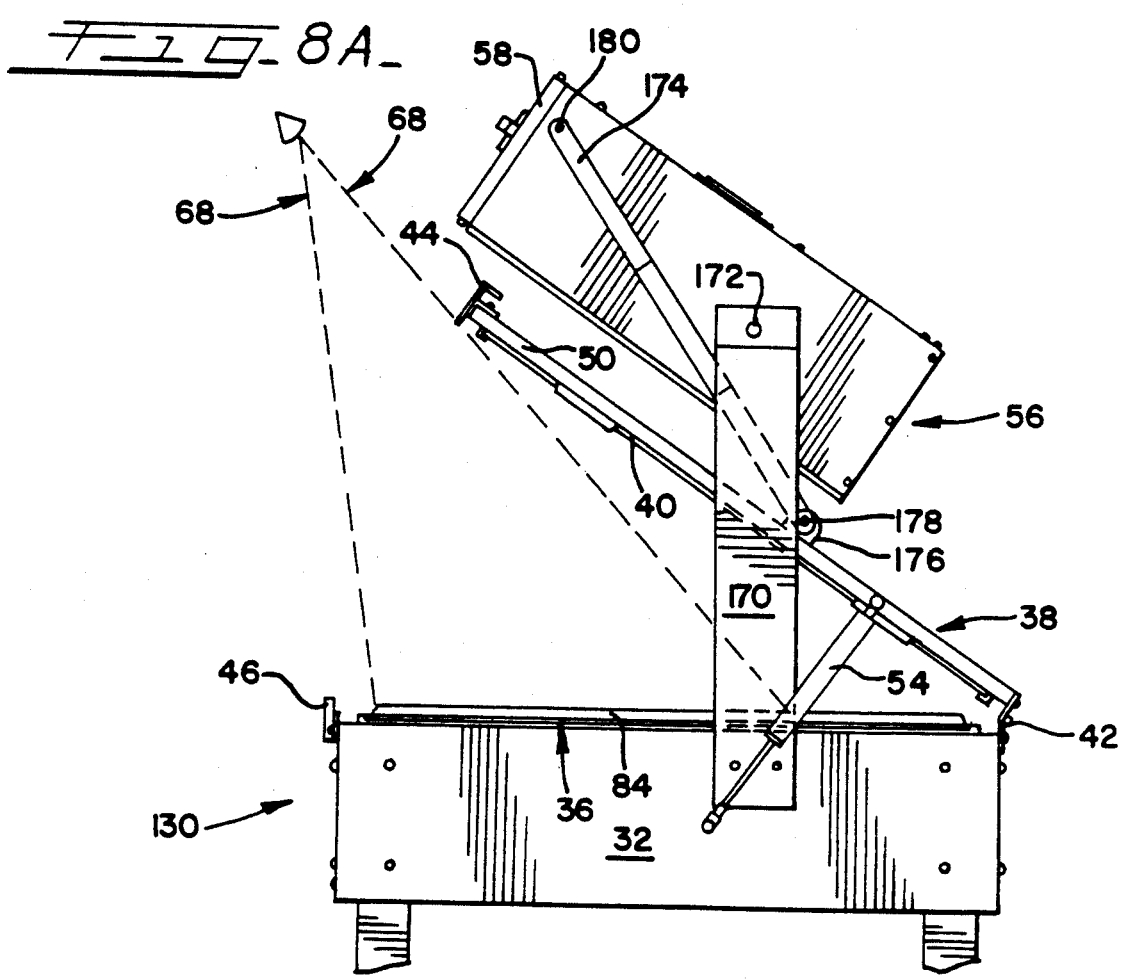

OVERHEAD LIGHT EXPOSURE APPARATUS

BACKGROUND OF THE INVENTION

1. Field of the Invention

The present invention relates to overhead exposure units for reproducing film images on photosensitive sheets such as silk screen, films, printing plates and the like used in the graphic arts industry. In particular, the present invention is directed towards a new and improved light exposure unit in which a light source is positioned with a relatively short distance between the light source and a silk screen, film or sheet on which an image is being reproduced so that a relatively high light intensity is afforded thereby minimizing the exposure time interval required during an operating exposure cycle. All this is accomplished in a unique overhead exposure unit wherein a light source, a glass panel and a supporting panel frame are pivotally movable relative to a horizontal base and vacuum blanket between a first or exposure position and a second or open position for providing easy loading and unloading of the film, silk screen, sheets etc.

2. Background of the Prior Art

In the past, many overhead light exposure units have employed high intensity lamps enclosed within a lamp housing supported and maintained at a fixed level or distance above a horizontally disposed vacuum frame assembly used for holding films and sheets, etc. in registration for reproduction and platemaking operations. With the advent of ever larger size vacuum frame assemblies, it has been necessary to increase the exposure spacing or distance between the light source and the vacuum frame assembly in order to provide a large enough space between an upwardly tilted, glass supporting frame and the horizontally disposed vacuum blanket. The open space is needed for both convenient viewing and registration of the materials and for easy loading and unloading of the film and sheet materials into and out of the exposure apparatus. This increase in the light source to frame exposure distance has been objectionable because unacceptably long exposure times have been required and production rates have thus suffered.

OBJECTS OF THE INVENTION

It is therefore an object of the present invention to provide a new and improved overhead light exposure unit of the character described capable of handling larger sized sheets, silk screens, films, etc., for reproduction, yet still providing enough open space for convenient viewing and handling of materials during loading and unloading operations, all without increasing the length of exposure time required for copy making.

Another object of the present invention is to provide a new and improved overhead exposure unit of the character described wherein an overhead light source and housing therefor is not maintained in a fixed relationship to a vacuum frame, but instead is movable so as to provide for better viewing during loading and unloading operations while minimizing the light source to vacuum frame exposure distance so that the time duration or interval of light exposure is maintained at a minimum.

Yet another object of the present invention is to provide a new and improved overhead light exposure unit of the type which employs a light source and supporting housing therefor that is movable yet remains at all times within a confined space above a fixed vacuum frame within a perimeter thereof.

Yet another object of the present invention is to provide a new and improved overhead light exposure unit of the character described which provides for better viewing of the vacuum frame during loading and unloading operations yet still provides a minimum spacing between the light source and the frame during a light exposure period of an operating reproduction cycle.

SUMMARY OF THE PRESENT INVENTION

The foregoing and other objects and advantages of the present invention are accomplished in a new and improved overhead light exposure unit for making film image reproductions on photosensitive sheets such as silk screens, media sheets, plates, films and the like. The exposure unit includes a base having a horizontally disposed vacuum blanket for pressing sheets and image forming films together against a transparent panel of glass or plastic. A frame supporting the transparent panel is pivotally mounted on the base for movement between an exposure position, generally horizontally parallel to and closely adjacent the vacuum blanket and an open position sloping upwardly thereof for providing ample open work space for convenience in the unloading and loading of sheet materials between exposures. The light source is positioned above the base for housing and directing a controlled intensity light beam downwardly through the transparent panel for reproducing images on one or more sheets held in precise registration with an image sheet by the horizontally disposed vacuum blanket. A support system is provided for holding the light source in an exposure position directly above the panel at a minimum light source to film distance and yet permitting movement of the light source in response to movement of the frame from a horizontal closed position toward an open position wherein interference to viewing of and access to the work area above the vacuum blanket is minimized during loading and unloading operations.

BRIEF DESCRIPTION OF THE DRAWINGS

For a better understanding of the present invention, reference should be had to the following detailed description taken in conjunction with the drawings, in which:

FIG. 1 is a side elevational view of a typical prior art overhead exposure unit;

FIG. 2 is a front elevational perspective view of a new and improved overhead exposure unit constructed in accordance with the present invention and showing an operator in a standing position in front of the unit during operation;

FIG. 4 is a front elevational view of the overhead exposure unit;

FIG. 5 is a top plan view of the overhead exposure unit;

FIG. 6 is an enlarged, fragmentary, cross-sectional view taken substantially along lines 6—6 of FIG. 5 illustrating the vacuum blanket before a fast vacuum draw-down is commenced;

FIG. 6A is an enlarged transverse cross-sectional view taken substantially along lines 6—6 of FIG. 5 but illustrating the vacuum blanket in drawn-down condition;

FIG. 7 is a front elevational view of another embodiment of a new and improved overhead exposure unit constructed in accordance with the features of the present invention;

FIG. 8 is a side elevational view of the overhead exposure unit of FIG. 7 showing the overhead light source in an exposure position above a horizontally disposed frame; and FIG. 8A is a side elevational view of the unit of FIG. 7 illustrating the overhead light source in an open position for loading and unloading.

DETAILED DESCRIPTION OF PREFERRED EMBODIMENTS OF THE PRESENT INVENTION

Figure 3:
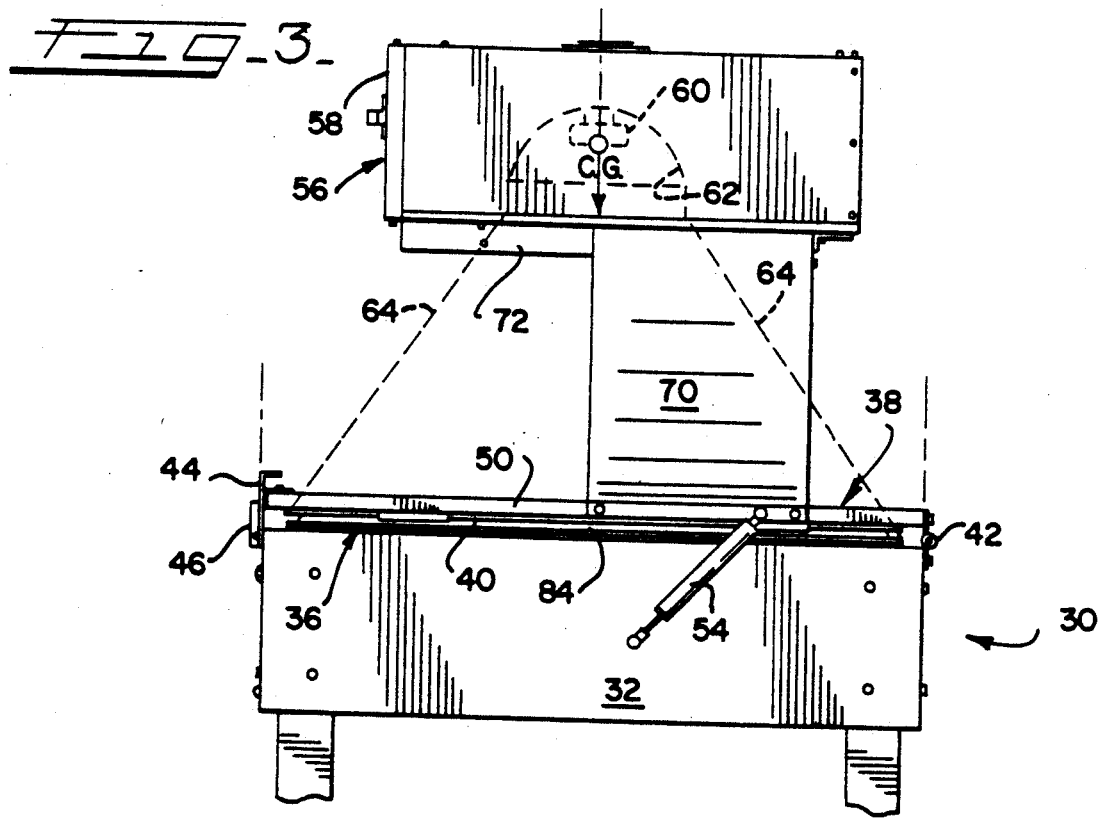
FIG. 3 is a side elevational view of the exposure unit showing the overhead light source in an exposure position above a horizontally disposed glass frame.

Referring now more particularly to the drawings, in FIG. 1 is illustrated a side elevational view of a typical prior art overhead exposure unit 10 including a rectangular base 12 having a horizontally disposed upper work surface with a vacuum blanket 14 mounted thereon. A frame 16 is pivotally connected to the base 12 along a rearward edge and a pair of air springs 18 are provided on opposite sides to support the frame 16 in an upwardly sloping or tilted open position as shown. The prior art exposure unit 10 includes a lamp housing 20 supported at a fixed or constant level above the horizontal vacuum blanket 14 on a pair of upstanding side supports 22. The lamp housing 20 contains a high intensity lamp 24 and a reflector 26 for directing a controlled, high intensity light beam indicated by the ray lines 28 downwardly through a glass panel contained in the frame 16 to reproduce images on film sheets, silk screens, plates, and the like, which are together in contact with a master image film sheet pressed against the glass panel of the frame 16.

With the advent and need for larger and larger size frames, it has been necessary to spread out the area of light from the reflector 26 to cover ever larger size sheets and this has resulted in a lower light intensity being available for image reproduction at the fixed level of the vacuum blanket 14. In turn, a lower intensity light beam requires a longer exposure time to provide the desired amount of exposure for reproduction.

Referring to FIGS. 2-5, therein is illustrated a new and improved overhead exposure unit 30 constructed in accordance with the teachings of the present invention and adapted to be supported from the floor or other support structure so that the upper, horizontal working surface of a rectangular base 32 is maintained at a convenient working level for an operator 34 standing in front of the unit and looking forwardly and downwardly at an angle towards an upper work surface of the base.

Figure 3A:
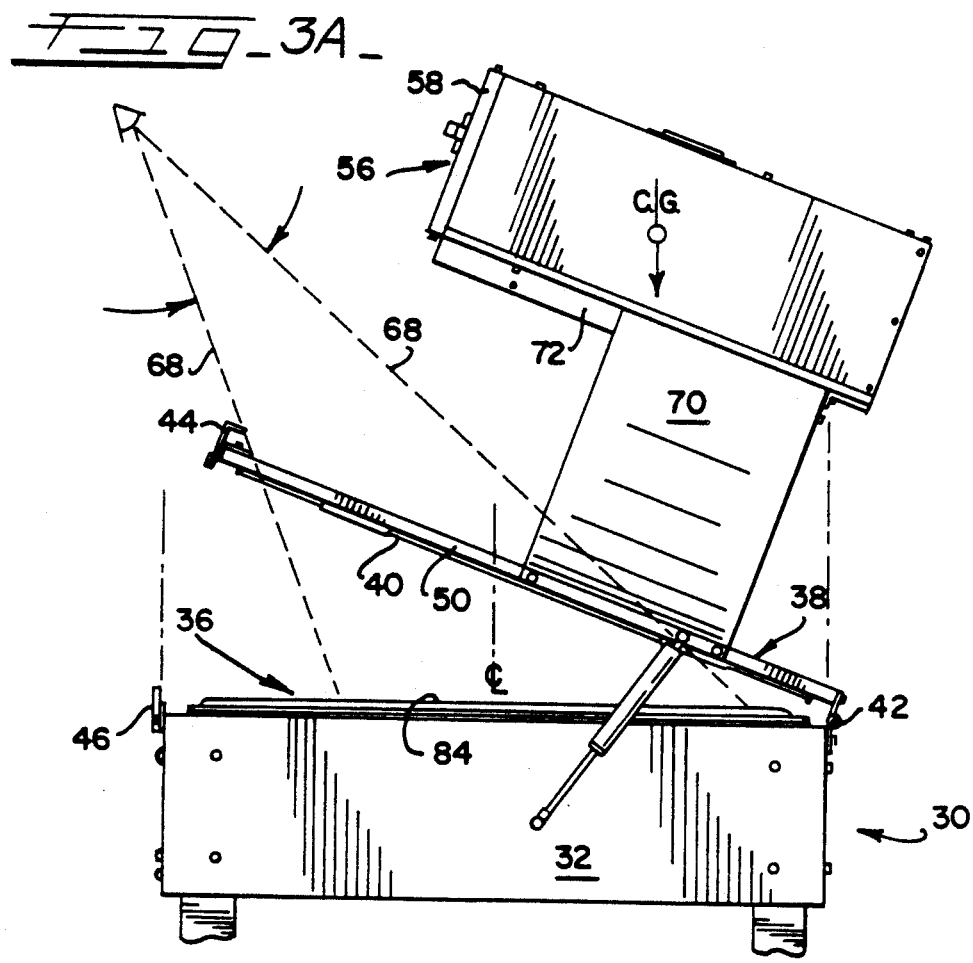
FIG. 3A is a side elevational view of the exposure unit showing the overhead light source in an open position for loading and unloading.

The base 32 provides support for a vacuum blanket assembly 36, which may be of a fast draw-down type as shown and described in copending U.S. patent application Ser. No. 353,055, filed May 17, 1989, assigned to the same assignee as the present application and incorporated hereby by reference, or a silk screen type vacuum blanket as illustrated in FIGS. 6 and 6A. The base 32 also provides support for a rectangular frame 38 which carries a flat, rectangular-shaped, transparent panel 40 of glass or plastic as best shown in FIGS. 6 and 6A. The frame 38 is pivotally secured to a rear side member of the base 32 with a plurality of hinges 42 for pivotal movement between a closed, horizontally disposed, exposure position as shown in FIGS. 2, 3, 4 and 5 and an upwardly sloping open position as shown in FIG. 3A.

Preferably the frame 38 may be of a type shown and described in a copending U.S. patent application Ser. No. 369,334, filed June 21, 1989, assigned to the same assignee as the present application and incorporated herein by reference. The frame 38 includes a latching mechanism 44 mounted on a front side member 48 of the frame adapted to latchingly engage a strike mechanism 46 mounted on a front side of the base 32 adjacent the upper edge as best shown in FIG. 3A. The frame 38 also includes a pair of relatively strong, stiff, metal side frame members 50 joined at their rearward ends to a rear frame member 52 carrying the upper leaves of the hinges 42.

As illustrated in FIGS. 6 and 6A, the respective frame members 48, 50 and 52 of the frame 38 may be formed of metal having a channel-shaped cross-section or a hollow tubular cross-section as needed to provide the desired degree of rigidity or stiffness and strength. In order to support the frame 38 in an upwardly sloping open position as shown in FIG. 3A, the overhead exposure unit 30 is provided with a pair of air springs 54, pivotally attached at lower ends to side members of the base 32 and pivotally interconnected at their upper ends to side frame members 50 of the frame 38 as best shown in FIGS. 6 and 6A. The air springs 54 are chosen to have a size and strength sufficient to support the frame 38 and the components carried thereby when the frame is unlatched and tilted upwardly into the open position as shown in FIG. 3A.

In accordance with the present invention, the overhead exposure unit 30 includes a generally rectangular lamp housing 56 having a control panel 58 on a front face in easy view of a standing operator 34 at approximately eye level as shown in FIG. 2. The lamp housing 56 contains a light source in the form of a high intensity lamp 60 which is directly centered above the frame 38 and base 32 as shown in FIG. 2. Light from the energized lamp 60 is focused and directed downwardly by an internal reflector 62 also contained in the housing 56 in order to provide a controlled light beam of proper intensity and spread angle. The beam indicated by ray lines 64 from the lamp 60 has a desired degree intensity when it reaches the level of the glass panel 40 in the closed horizontal position as shown in FIGS. 3 and 4. The lamp reflector 62 is designed so that the rays of light from the energized lamp 60 are properly focused to insure a desired level of light intensity at the horizontally disposed working surface of the glass panel 40 of the frame 38 in a closed position.

The same degree of light intensity at the level of the frame 38 can be obtained for frames of increased size by reducing the light source to frame exposure distance. With an overhead exposure unit of a prior art design wherein the lamp is always at a fixed level above a work surface, a reduction in distance between the lamp source and work surface to accommodate wider and larger frames, would present an obstruction to a clear view of the working area because of the position of the relatively large lamp housing in the operator's line of sight.

In accordance with the present invention, however, the exposure distance from the lamp 60 to the vacuum blanket 36 may be reduced considerably from that of prior art units and without substantial obstruction to the view or access to the working area because of a unique feature wherein the lamp housing 56 is supported from and moves with the pivotally movable frame 38 so as to pivot upwardly out of the view of an operator 34 to an open position as shown in FIG. 3A wherein the operator's eyes at normal eye level have a nearly unobstructed view of the entire work surface of the base 32 as indicated by the ray lines 68. This result is obtained because the lamp housing 56 is tilted back and out of the way as illustrated in FIG. 3A.

The lamp housing 56 is supported on a pair of side frame support members 70, which members in turn are fixedly attached to the side frame members 50 of the frame 38 at their lower ends. Upper ends of the support members 70 are fixedly attached to opposite ends of the lamp housing 56 through side support angles 72 of a lower support frame of the lamp housing. It will thus be seen that the lamp 60 and its supporting housing 56 both are pivotally moved along with the frame 38 when the frame is unlatched and pivoted upwardly from the horizontally disposed exposure position as shown in FIGS. 2, 3, 4 and 5. When the frame 38 is tilted upwardly to the open position, as shown in FIG. 3A, the operator 34 can clearly view even a rearward portion of the work area on the vacuum blanket 36 as indicated by the ray lines 68, which lines pass through the glass panel 40. In this manner, the lamp to vacuum frame exposure distance can be shortened up as needed to provide the same or increased intensity of light for larger and wider size frames and thus maintain or even reduce the exposure time required.

It should also be noted that the center of gravity of the lamp housing 56 and contents is substantially at the geometric center thereof as viewed in side elevation and even though the lamp housing 56 is pivoted or tilted upwardly and backwardly out of the way, the center of gravity thereof never moves outside of an area bounded by an upward extension of the peripheral edges of the base 32. This provides for a physically stable arrangement even when the lamp housing 56 and contents are relatively heavy in relation to the base 32. Whenever the frame 38 is unlatched and opened to pivot upwardly the lamp housing 56 and contents also tilts upwardly and backwardly out of the way to afford an excellent view of the horizontally extending working area above the base 32. This area is also easily accessible from the front side of the overhead exposure unit 30 between the front edge 48 of the upwardly tilted frame 38 and the horizontal work surface of the vacuum blanket 36.

Referring momentarily to FIGS. 6 and 6A, the overhead exposure unit 30 is especially well adapted for reproducing images from a master film or sheet 74 onto photo-sensitive silk screen 76 or other types of sheet media which are sometimes mounted on a relatively large wood frame 78. For this purpose, the upper portion of the base 32 is provided with a shallow, pan-like recessed top wall 80 having a solid segment around its periphery or marginal edge 32a of the base. The shallow recess in the central portion of the top pan 80 is adapted to accommodate a relatively thick silk screen frame 78 and the vacuum blanket assembly 36. The blanket assembly 36 includes a flexible resilient blanket 82 having a seal bead 84 around the periphery thereof adapted to provide a peripheral edge seal against the underside of the glass panel 40, whenever a space 86 (FIG. 6) between the upper surface of the flexible blanket 82 and the lower face of the glass panel 40 within the sealed periphery 84 is evacuated.

As illustrated in FIG. 6A, when evacuation takes place, the flexible vacuum blanket 82 closely conforms to the shape of the frame 78 and biases the silk screen sheet 76 and the image forming film sheet 74 tightly against the underside of the glass panel 40 in precise registration ready for a timed exposure cycle when the lamp 60 is illuminated. A vacuum is drawn on the space 86 by a vacuum pump (not shown) and a vacuum line 88 is connected from the pump to the space 86 through a bell-like fitting 90 as shown. After a light exposure cycle has been completed, the space 86 is again vented to the atmosphere and the flexible vacuum blanket 82 returns to a relaxed position as shown in FIG. 6.

Referring now to FIGS. 7, 8 and 8A, therein is illustrated another embodiment of an overhead exposure unit constructed in accordance with the features of the present invention and referred to generally by the reference numeral 130. Components of the unit 130 that are identical or similar to those in the overhead exposure unit 30 will have the same reference numerals and will not be discussed herein in detail. The overhead exposure unit 130 includes a lamp housing 56 spaced above a rectangular base 32 supported on a pair of upstanding support members 170. The lamp housing 56 is pivotally mounted on pins 172 at the upper end of the supports 170 for pivotal movement between a horizontal, closed or exposure position as shown in FIG. 8 and an open position as shown in FIG. 8A wherein the lamp housing 56 is pivoted upwardly and backwardly away to afford a standing operator a substantially unobstructed view of the entire horizontal work surface above the base 32 and vacuum blanket 36 as indicated by the sight or ray lines 66 in FIG. 7 and light ray lines 68 in FIG. 8A. A frame 38 is pivotally secured to the backside of the base 32 by a plurality of hinges 42 and when the frame 38 is unlatched and pivoted upwardly from the horizontal or exposure position of FIG. 8 to the upwardly tilted, open position of FIG. 8A, the lamp housing 56 is simultaneously pivoted to tilt upwardly and backwardly out of the way. For this purpose, a pair of pivot links 174 are interconnected between brackets 176 and pivot pins 178 attached to side members 50 of the frame 38 and pivot pins 180 attached to the lamp housing 56 on opposite sides thereof. As illustrated, when the lamp housing 56 and the frame 38 are pivoted upwardly to the open position of FIG. 8A, the interconnecting links 174 cause these two members to pivot in unison.

It should also be noted that the center of gravity of the lamp housing 56 is near the geometrical center thereof and moves only slightly to the rear as the housing is pivoted from the exposure position of FIG. 8 to the open position of FIG. 8A. Moreover, the entire lamp housing 56 is maintained well within a space directly above the base 32 bounded by the periphery thereof. The unit 130 is thus very stable in a physical sense as the frame 38 and lamp housing 56 are pivotally moved between open and closed positions during copy making and platemaking activities. The overhead exposure unit 130 affords the advantage of fast exposure times with large size sheets because of the relatively close spacing between the lamp 60 and the frame 38 as previously discussed herein in connection with the overhead exposure unit 30. It should also be noted that both the overhead exposure unit 30 and the overhead exposure unit 130 provide for precise control and positioning of the lamp housing 56 and the lamp 60 and reflector 62 when the housing is centered above the vacuum blanket 36 in an exposure position. In the exposure position, the center of the lamp 60 is positioned substantially directly above the center of the frame 38 and a center line light ray of high intensity illumination is directed vertically downwardly from the lamp 60 to strike at a right angle to the face of the closed glass panel 40 and the film sheets 74 and 76.

Many modifications and variations of the present invention are possible in light of the foregoing specification and thus, it is to be understood that within the scope of the appended claims, the invention may be practiced otherwise than as specifically described.

What is claimed and desired to be secured by Letters Patent of the United States is:

1. An overhead light exposure unit for making copies on pre-sensitized sheets from images on sheets, comprising;
   a base supporting a vacuum blanket for pressing said sheets and film against a transparent panel, said transparent panel mounted in a frame, said frame pivotally secured to said base for movement between a closed position for making copies and an upwardly tilted open position for loading and unloading said sheets and film;
   a light source in spaced apart parallel relation above said panel for directing controlled light downwardly to produce said film images on said sheets placed below said panel on said vacuum blanket; and
   support means extending between said frame and said light source for securing said light source in said spaced apart parallel relation above said panel to move in unison with said pivotally mounted frame, said support means securing said light source at a fixed spacing distance in relation to said transparent panel during pivotal movement of said transparent panel and said frame on said base.

2. The overhead exposure unit of claim 1, wherein: said support means includes an upright member secured to said base and pivotally supporting said light source above said base.

3. An overhead light exposure unit for making film image reproductions on photo-sensitive sheets such as silk screens, films etc, comprising:
   a base including a flexible vacuum blanket for pressing said sheets and image forming film together against a transparent panel;
   a frame supporting said transparent panel and pivotally mounted on said base for movement between an exposure position adjacent said vacuum blanket and an open position sloped upwardly thereof for loading and unloading said sheets and film;
   light source means spaced above said base for directing controlled beam of light downwardly toward said panel for reproducing said images, said beam maintained at a fixed angle with respect to said panel during movement of said frame between said exposure position and said open position, said support means including an upright member secured to said base and pivotally supporting said light source above said base.

4. The overhead exposure unit of claim 2, wherein: said support means includes a link member pivotally secured to said frame and said light source for pivoting said light source relative to said frame when said frame moves between said open and closed position.

5. The overhead exposure unit of claim 1, wherein:
   said light source includes a reflector and an enclosing housing; and
   wherein said light source has a center of gravity positioned to remain within a space defined upwardly of a perimeter of said base as said light source is moved when said frame is moved between said open and said closed postion.

6. The overhead exposure unit of claim 5, wherein:
   said housing has a profile which remains confined within a space defined upwardly of said perimeter of said base as said light source moves during movement of said frame between said open and said closed position.

7. The overhead exposure unit of claim 4, wherein:
   said link member is interconnected to pivot said light source closer to said frame as said frame is pivoted from said closed toward said open position.

8. The overhead exposure unit of claim 7, including:
   latch means for securing said frame in said closed position.

9. The overhead light exposure unit of claim 3, wherein:
   said light source means is tilted with respect to said base when moved to said open position.

10. The overhead light exposure unit of claim 9, wherein:
    said light source means is contained within a housing; and
    said housing is pivotally mounted on said support means on a pivot axis spaced above said base.

11. The overhead light exposure unit of claim 10, wherein:
    said support means is fixedly secured to said base.

12. The overhead light exposure unit of claim 11, wherein:
    said housing is positioned to remain within a space above said base defined by the periphery thereof during pivotal movement.

13. The overhead light exposure unit of claim 3, wherein:
    said light source means is contained within a housing; and
    said support means is secured to said housing and said frame for maintaining a fixed spaced apart relationship therebetween.

14. The overhead light exposure unit of claim 13, wherein:
    said housing and said light source means are positioned with a center of gravity that is contained within a space above said base defined within a periphery thereof as said frame is moved between said exposure position and said open position.

15. The overhead light exposure unit of claim 3, including:
    a housing for said light source means having a forward edge and a rearward edge; and
    said forward edge is spaced a greater distance from said base in said open position than said rearward edge.

16. The overhead light exposure unit of claim 15, wherein:
    said forward edge of said housing is spaced from said base a greater distance when said frame is in said open position than in said exposure position.

* * * * *